US010002689B2

(12) United States Patent
Straniero et al.

(10) Patent No.: US 10,002,689 B2
(45) Date of Patent: Jun. 19, 2018

(54) METAL SHEATHED CABLE WITH JACKETED, CABLED CONDUCTOR SUBASSEMBLY

(71) Applicant: AFC Cable Systems, Inc., New Bedford, MA (US)

(72) Inventors: George Anthony Straniero, Cliffwood, NJ (US); Paul R. Picard, East Greenwich, RI (US); Richard A. Ricci, Somerset, MA (US); Peter Lafreniere, Mattapoisett, MA (US)

(73) Assignee: AFC Cable Systems, Inc., New Bedford, MA (US)

( * ) Notice: Subject to any disclaimer, the term of this patent is extended or adjusted under 35 U.S.C. 154(b) by 0 days. days.

(21) Appl. No.: 14/674,095

(22) Filed: Mar. 31, 2015

(65) Prior Publication Data

US 2016/0196899 A1 Jul. 7, 2016

Related U.S. Application Data

(60) Provisional application No. 62/100,542, filed on Jan. 7, 2015.

(51) Int. Cl.
*H01B 7/18* (2006.01)
*H01B 9/02* (2006.01)
(Continued)

(52) U.S. Cl.
CPC ............. *H01B 9/02* (2013.01); *H01B 7/0225* (2013.01); *H01B 7/18* (2013.01); *H01B 9/003* (2013.01); *H01B 9/028* (2013.01); *H01B 13/22* (2013.01)

(58) Field of Classification Search
CPC .......... H01B 9/02; H01B 9/028; H01B 13/22; H01B 7/18; H01B 7/0225; H01B 11/04; H01B 7/0208
See application file for complete search history.

(56) References Cited

U.S. PATENT DOCUMENTS 2,761,893 A * 9/1956 Morrison ............... H01B 7/041 174/116
5,418,878 A * 5/1995 Sass ................... H01B 11/1891 385/101

(Continued)

FOREIGN PATENT DOCUMENTS

EP 3043358 B1 7/2016
WO 20130176601 A1 11/2013

OTHER PUBLICATIONS

Extended European Search Report for European Application No. 15202975.7 dated Apr. 29, 2016 (8 pgs).

(Continued)

*Primary Examiner* — Steven T Sawyer

(57) ABSTRACT

A Metal-Clad (MC) cable assembly includes a core having a plurality of power conductors cabled with a subassembly, each of the plurality of power conductors and the subassembly including an electrical conductor, a layer of insulation, and a jacket layer. The MC cable assembly further includes an assembly jacket layer disposed over the subassembly, and a metal sheath disposed over the core. In one approach, the subassembly is a cabled set of conductors (e.g., twisted pair) operating as class 2 or class 3 circuit conductors in accordance with Article 725 of the National Electrical Code®. In another approach, the MC cable assembly includes a protective layer disposed around the jacket layer of one or more of the plurality of power conductors and the subassembly. In yet another approach, a bonding/grounding conductor is cabled with the plurality of power conductors and the subassembly.

17 Claims, 14 Drawing Sheets

(51) Int. Cl.
*H01B 7/02* (2006.01)
*H01B 13/22* (2006.01)
*H01B 9/00* (2006.01)

(56) References Cited

U.S. PATENT DOCUMENTS

| | | | | |
|---|---|---|---|---|
| 5,956,445 | A * | 9/1999 | Deitz, Sr. | G02B 6/441 174/24 |
| 6,114,632 | A † | 9/2000 | Planas | |
| 6,249,913 | B1 * | 6/2001 | Galipeau | H04N 7/17318 348/E5.002 |
| 6,486,395 | B1 † | 11/2002 | Temblador | |
| 7,038,138 | B2 * | 5/2006 | Laity | H01R 13/72 174/113 R |
| 7,208,684 | B2 † | 4/2007 | Fetterolf | |
| 8,088,997 | B2 * | 1/2012 | Picard | H01B 9/028 174/102 R |
| 9,018,529 | B2 | 4/2015 | Sidlyarevich | |
| 2003/0121694 | A1 * | 7/2003 | Grogl | H01B 3/441 174/113 R |
| 2006/0021786 | A1 * | 2/2006 | Fetterolf, Sr. | H01B 9/02 174/113 R |
| 2006/0021787 | A1 | 2/2006 | Fetterolf, Sr. et al. | |
| 2007/0074891 | A1 * | 4/2007 | Burke | H01B 7/06 174/113 R |
| 2008/0277138 | A1 * | 11/2008 | Gallens | D07B 1/148 174/111 |
| 2013/0264112 | A1 * | 10/2013 | Xu | H01B 7/17 174/70 R |
| 2014/0064681 | A1 * | 3/2014 | Register, III | G02B 6/4416 385/101 |
| 2014/0096996 | A1 * | 4/2014 | Sidlyarevich | H01B 7/04 174/115 |
| 2015/0170799 | A1 * | 6/2015 | Varkey | G02B 6/4416 174/70 R |

OTHER PUBLICATIONS

Extended European Search Report for European Application No. 15202972.4 dated Apr. 29, 2016 (8 pgs).

Underwriters Laboratories Inc., "Standard UL 1569", title pages (3 sheets), copyright pages (2 sheets), table of contents (pp. 3-5), and Section 7.2 (pp. 15-17), published in 2012. This standard "consists of the Third Edition including revisions through Jan. 6, 2012." The latest revision to Section 7.2 was on Jan. 7, 2005.†

Underwriters Laboratories Inc., "Standard UL 1569", title pages (3 sheets), copyright pages (2 sheets), table of contents (pp. 3-5), and Section 12 (pp. 19-21), published in 2012. This standard "consists of the Third Edition including revisions through Jan. 6, 2012." The latest revision to Section 12 was on Jun. 24, 2009.†

Underwriters Laboratories Inc., "Certification Requirement Decision for Standard UL 1569", Section 9.4, published on Nov. 13, 2014.†

Belden Inc., Product datasheet titled "2505PTZ Composite—For PTZ Cameras: CCTV+ Control+ Power", published on Jan. 27, 2010.†

Belden Inc., New Product Bulletin entitled "Metal-sheathed Communication Cables", published in 2008.†

* cited by examiner
† cited by third party

METAL SHEATHED CABLE WITH JACKETED, CABLED CONDUCTOR SUBASSEMBLY

CROSS-REFERENCE TO RELATED APPLICATION

This is a non-provisional of pending U.S. provisional patent application Ser. No. 62/100,542, filed Jan. 7, 2015, the entirety of which application is incorporated by reference herein.

BACKGROUND OF THE DISCLOSURE

Field of the Disclosure

The present disclosure relates generally to a Metal-Clad cable type. More particularly, the present disclosure relates to a Metal-Clad cable assembly including a cabled conductor subassembly surrounded by a jacket layer.

Discussion of Related Art

Armored cable ("AC") and Metal-Clad ("MC") cable provide electrical wiring in various types of construction applications. The type, use and composition of these cables should satisfy certain standards as set forth, for example, in the National Electric Code® (NEC). (National Electrical Code and NEC are registered trademarks of National Fire Protection Association, Inc.) These cables house electrical conductors within a metal armor. The metal armor may be flexible to enable the cable to bend while still protecting the conductors against external damage during and after installation. The armor which houses the electrical conductors may be made from steel or aluminum, copper-alloys, bronze-alloys and/or aluminum alloys. Typically, the metal armor sheath is formed from strip steel, for example, which is helically wrapped to form a series of interlocked sections along a longitudinal length of the cable. Alternatively, the sheaths may be made from smooth or corrugated metal.

Generally, AC and MC cable have different internal constructions and performance characteristics and are governed by different standards. For example, AC cable is manufactured to UL Standard 4 and can contain up to four (4) insulated conductors individually wrapped in a fibrous material which are cabled together in a left hand lay. Each electrical conductor is covered with a thermoplastic insulation and a jacket layer. The conductors are disposed within a metal armor or sheath. If a grounding conductor is employed, the grounding conductor is either (i) separately covered or wrapped with the fibrous material before being cabled with the thermoplastic insulated conductors; or (ii) enclosed in the fibrous material together with the insulated conductors for thermoset insulated conductors. In either configuration, the bare grounding conductor is prevented from contacting the metal armor by the fibrous material. Additionally, in type AC cable, a bonding strip or wire is laid lengthwise longitudinally along the cabled conductors, and the assembly is fed into an armoring machine process. The bonding strip is in intimate contact with the metal armor or sheath providing a low-impedance fault return path to safely conduct fault current. The bonding wire is unique to AC cable and allows the outer metal armor in conjunction with the bonding strip to provide a low impedance equipment grounding path.

In contrast, MC cable is manufactured according to UL standard 1569 and includes a conductor assembly with no limit on the number of electrical conductors. The conductor assembly may contain a grounding conductor. The electrical conductors and the ground conductor are cabled together in a left or right hand lay and encased collectively in an overall covering. Similar to AC cable, the assembly is then fed into an armoring machine where metal tape is helically applied around the assembly to form a metal sheath. The metallic sheath of continuous or corrugated type MC cable may be used as an equipment grounding conductor if the ohmic resistance satisfies the requirements of UL 1569. A grounding conductor may be included which, in combination with the metallic sheath, would satisfy the UL ohmic resistance requirement. In this case, the metallic sheath and the grounding/bonding conductor would comprise what is referred to as a metallic sheath assembly.

In many applications it is desirable to provide low-voltage wiring, such as wiring defined by Article 725 of the NEC® as Class 2 and Class 3. Class 2 and Class 3 wiring is used for powering and controlling devices such as dimmers, occupancy sensors, luminaries, lighting controls, security, data, low voltage lighting, thermostats, switches, low-voltage medical devices, and the like. With prior arrangements, such Class 2 or 3 low-voltage wiring is installed separate from higher voltage AC or MC cable (e.g., 120V or 277V). However, this results in a less efficient installation process, as multiple different cabling lines must be measured, cut, installed, connected, etc.

SUMMARY OF THE DISCLOSURE

Exemplary approaches provided herein are directed to a Metal-Clad cable assembly. In an exemplary approach, a Metal-Clad (MC) cable assembly includes a core having a plurality of power conductors cabled with a subassembly, each of the plurality of power conductors and the subassembly including an electrical conductor, a layer of insulation, and a jacket layer. The MC cable assembly further includes an assembly jacket layer disposed over the subassembly, and a metal sheath disposed over the core. In one approach, the subassembly is a cabled set of conductors (e.g., twisted pair) operating as class 2 or class 3 circuit conductors, as defined by Article 725 of the NEC®. In another approach, the core includes a polymeric protective layer disposed around the jacket layer along one or more of the plurality of power conductors and the subassembly. In yet another approach, a bonding/grounding conductor is cabled with the plurality of power conductors and the subassembly.

A metal clad cable assembly is disclosed. The metal clad cable assembly may include a core having a plurality of power conductors cabled with a subassembly, each of the plurality of power conductors and the subassembly including an electrical conductor, a layer of insulation, and a jacket layer. The metal clad cable assembly may further include an assembly jacket layer disposed over the subassembly, and a metal sheath disposed over the core.

A metal clad cable assembly is disclosed. The metal clad cable assembly may include a core including a plurality of power conductors cabled with a subassembly, each of the plurality of power conductors and the subassembly including an electrical conductor, a layer of insulation, and a jacket layer. The metal clad cable assembly may further include an assembly jacket layer disposed over the subassembly, and a metal sheath disposed over the plurality of power conductors and the subassembly.

A method of making a metal clad cable assembly is disclosed. The method may include providing a core including a plurality of power conductors cabled with a subassembly, each of the plurality of power conductors and the subassembly including an electrical conductor, a layer of insulation, and a jacket layer. The method may further include disposing an assembly jacket layer over the subassembly, and disposing a metal sheath over the core.

BRIEF DESCRIPTION OF THE DRAWINGS

The accompanying drawings illustrate exemplary approaches of the disclosed metal clad cable assembly so far devised for the practical application of the principles thereof, and in which.

DESCRIPTION OF EMBODIMENTS

Figure 1:
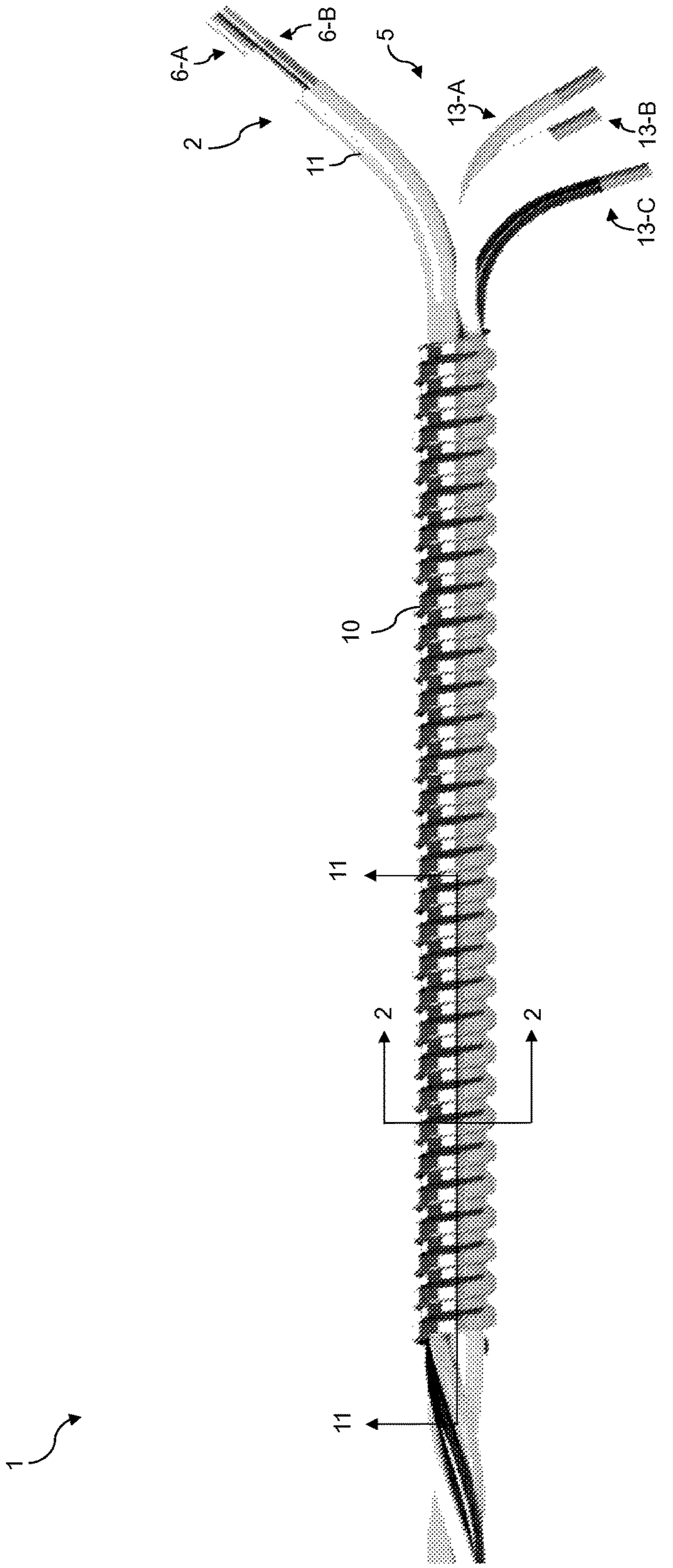
FIG. 1 is a side view of an MC cable assembly according to an exemplary approach.

The present disclosure will now proceed with reference to the accompanying drawings, in which various approaches are shown. It will be appreciated, however, that the disclosed MC cable assembly may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

As used herein, an element or operation recited in the singular and proceeded with the word "a" or "an" should be understood as not excluding plural elements or operations, unless such exclusion is explicitly recited. Furthermore, references to "one approach" of the present disclosure are not intended to be interpreted as excluding the existence of additional approaches that also incorporate the recited features.

As stated above, exemplary approaches provided herein are directed to a Metal-Clad cable assembly. In an exemplary approach, a Metal-Clad (MC) cable assembly includes a core having a plurality of power conductors cabled with a subassembly, each of the plurality of power conductors and the subassembly including an electrical conductor, a layer of insulation, and a jacket layer. The MC cable assembly further includes an assembly jacket layer disposed over the subassembly, and a metal sheath disposed over the core. In one approach, the subassembly is a cabled set of conductors (e.g., twisted pair) operating as class 2 or class 3 circuit conductors, as defined by Article 725 of the NEC®. In another approach, each conductor of the core includes a polymeric protective layer disposed around the jacket layer along the length of each of the electrical conductors. In yet another approach, a bonding/grounding conductor is cabled with the plurality of power conductors and the subassembly. These approaches enable Class 2 or 3 low-voltage wiring to be included with power conductors within the metal sheath of an AC or MC cable to add mechanical protection, simplify installation and reduce overall cost.

Referring now to the side view of FIG. 1, an exemplary MC cable assembly according to an exemplary approach will be described in greater detail. As shown, MC cable assembly 1 has a cable subassembly 2 cabled with a plurality of power conductors 13A-C to form a core 5. The cable subassembly 2 and plurality of power conductors 13A-C may be cabled together in either a right or left hand lay. Core 5 can be enclosed by a metal sheath 10. As shown, cable subassembly 2 includes a first conductor 6-A and a second conductor 6-B cabled together to form a twisted pair conductor subassembly, which is disposed within an assembly jacket layer 11. In an exemplary approach, cable subassembly 2 comprises wiring principally for Class 2 and Class 3 circuits, as described in Article 725 of the NEC®. Although only a single pair of conductors 6A, 6B is shown in subassembly 2, it will be appreciated that subassembly 2 may have additional pairs (e.g., 4 wires ranging from 2-12 AWG). Alternately, in another approach, more than one subassembly 2 can be included within core 5.

The first and second conductors 6A-B of subassembly 2 may each be, for example, 16 American Wire Gauge (AWG) solid conductors, while plurality of conductors 13A-C may each be, for example, 12 AWG solid and/or stranded electrical conductors. In some approaches, the plurality of power conductors 13A-C includes first, second and third power conductors (e.g., 120V or 277V). In an exemplary approach, each of the conductors 6A-B can have a size between 24 AWG and 6 AWG such that conductors 6A-B are configured to conduct a voltage between zero (0) and approximately 300 Volts. In some approaches, each of the plurality of power conductors 13A-C can have a size between 18 AWG and 2000 KCM.

Metal sheath 10 may be formed as a seamless or welded continuous sheath, and has a generally circular cross section with a thickness of about 0.005 to about 0.060 inches. Alternatively, metal sheath 10 may be formed from flat or shaped metal strip, the edges of which are helically wrapped and interlock to form a series of convolutions along the length of the cable 1. In this manner, metal sheath 10 allows the resulting MC cable assembly 1 to have a desired bend radius sufficient for installation within a building or structure. The sheath 10 may also be formed into shapes other than generally circular such as, for example, rectangles, polygons, ovals and the like. Metal sheath 10 provides a protective metal covering around core 5.

Referring now to the cross-sectional views of FIGS. 2-3, the MC cable assembly 1 taken along cut line 2-2 of FIG. 1 will be described in greater detail. As shown, conductors 6A-B and 13A-C can each include a stranded or solid electrical conductor 12 having a concentric insulation layer(s) 14, and a jacket layer 16 disposed on the insulation layer 14. In some approaches, the concentric insulation layer 14 and the jacket layer 16 are extruded over each of the individual electrical conductors 12 of the plurality of power conductors 13A-C and the subassembly 2.

The electrical conductor 12, insulation layer 14 and jacket layer 16 may define an NEC® Type thermoplastic fixture wire nylon (TFN), thermoplastic flexible fixture wire nylon (TFFN), thermoplastic high heat resistant nylon (THHN), thermoplastic heat and water resistant nylon (THWN) or THWN-2 insulated conductor. In other approaches the conductors 6A-B and 13A-C may define an NEC® Type thermoplastic heat and water resistant (THW), thermoplastic high heat and water resistant (THHW), cross-linked polyethylene high heat-resistant water-resistant (XHHW) or XHHW-2 insulated conductor. In one exemplary approach, the insulation layer 14 is polyvinylchloride (PVC) and has a thickness of approximately 15-125 mil. In one approach, jacket layer 16 is nylon and has a thickness of approximately 4-9 mil.

Subassembly 2 is disposed within assembly jacket layer 11, which extends along the length of the subassembly 2 and is located within metal sheath 10 in an area adjacent each power conductor 13A-C. In exemplary approaches, assembly jacket layer 11 is PVC and has a thickness in the range of 5-80 mils. In one non-limiting exemplary approach, assembly jacket layer 11 has a thickness of approximately 15-30 mils. However, it will be appreciated that the thickness of assembly jacket layer 11 can vary depending on the diameter of the core it surrounds. For example, larger diameter conductors generally require a thicker jacket layer. As further shown, an assembly tape 15 may be disposed around the cabled core 5.

As stated above, the subassembly 2 may be cabled, in a right or left handed lay, with the plurality of power conductors 13A-C to form core 5. Alternatively, the subassembly and the plurality of power conductors 13A-C may extend longitudinally along the metal sheath 10 such that the longitudinal axis of each conductor runs parallel to a longitudinal axis of metal sheath 10.

Although not shown, it will be appreciated that MC cable assembly 1 may include one or more filler members within metal sheath 10. In one approach, a longitudinally oriented filler member is disposed within metal sheath 10 adjacent to subassembly 2 and/or one or more of the plurality of power conductors 13A-C to press subassembly 2 and power conductors 13A-C radially outward into contact with the inside surface of metal sheath 10. The filler member can be made from any of a variety of fiber or polymer materials. Furthermore, the filler member can be used with MC Cable assemblies having any number of insulated conductor assemblies.

Referring now to the cross-sectional view of FIG. 4, an MC cable assembly 100 according to another approach will be described in greater detail. As shown, the MC cable assembly 100 can include any or all of the features of the MC able assembly 1 shown in FIG. 2, including a core 5 having a subassembly 2 and one or more power conductors 13A-C each having the features previously described in relation to FIG. 2. An assembly tape 15 may be disposed about the core 5 in the manner previously described. In the approach shown in FIG. 4, MC cable assembly 100 includes a concentric core jacket layer 17 located within the metal sheath 10 and disposed around the core 5. As shown, the core jacket layer 17 may be formed (e.g., extruded) over an outer surface of the assembly tape 15. The core jacket layer 17 provides a moisture resistant barrier that may be used as an alternative to using wet rated conductors for cables that are rated for wet locations. Additionally, the core jacket 17 may be used to provide additional mechanical protection. In exemplary approaches, core jacket layer 17 may be a thermoplastic or a thermoset polymeric material, and has a thickness in the range of 30-85 mils.

Figure 4:
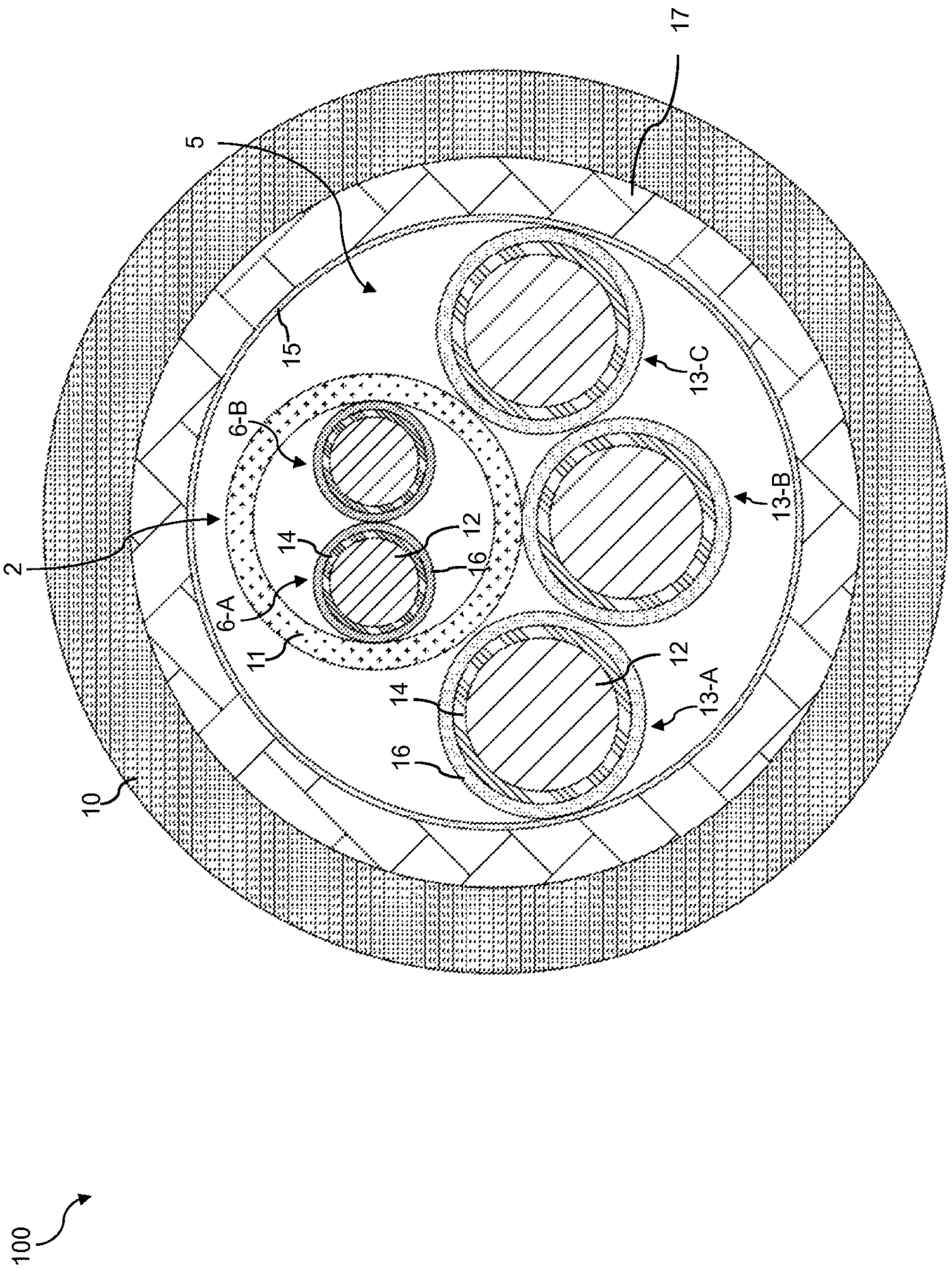
FIG. 4 is a cross-sectional view of another MC cable assembly according to an exemplary approach.

Similar to above, conductors 6A-B and 13A-C shown in FIG. 4 may each include a stranded or solid electrical conductor 12 having a concentric insulation layer(s) 14 and a jacket layer 16 disposed on the insulation layer 14. Subassembly 2 may be disposed within assembly jacket layer 11, which can extend along the length of the subassembly 2. A metal sheath 10 may be provided around the subassembly 2, power conductors 13A-C, assembly tape 15 and core jacket layer 17. The features of these individual elements may be the same as previously described in relation to the embodiment of FIG. 2.

Figure 5:
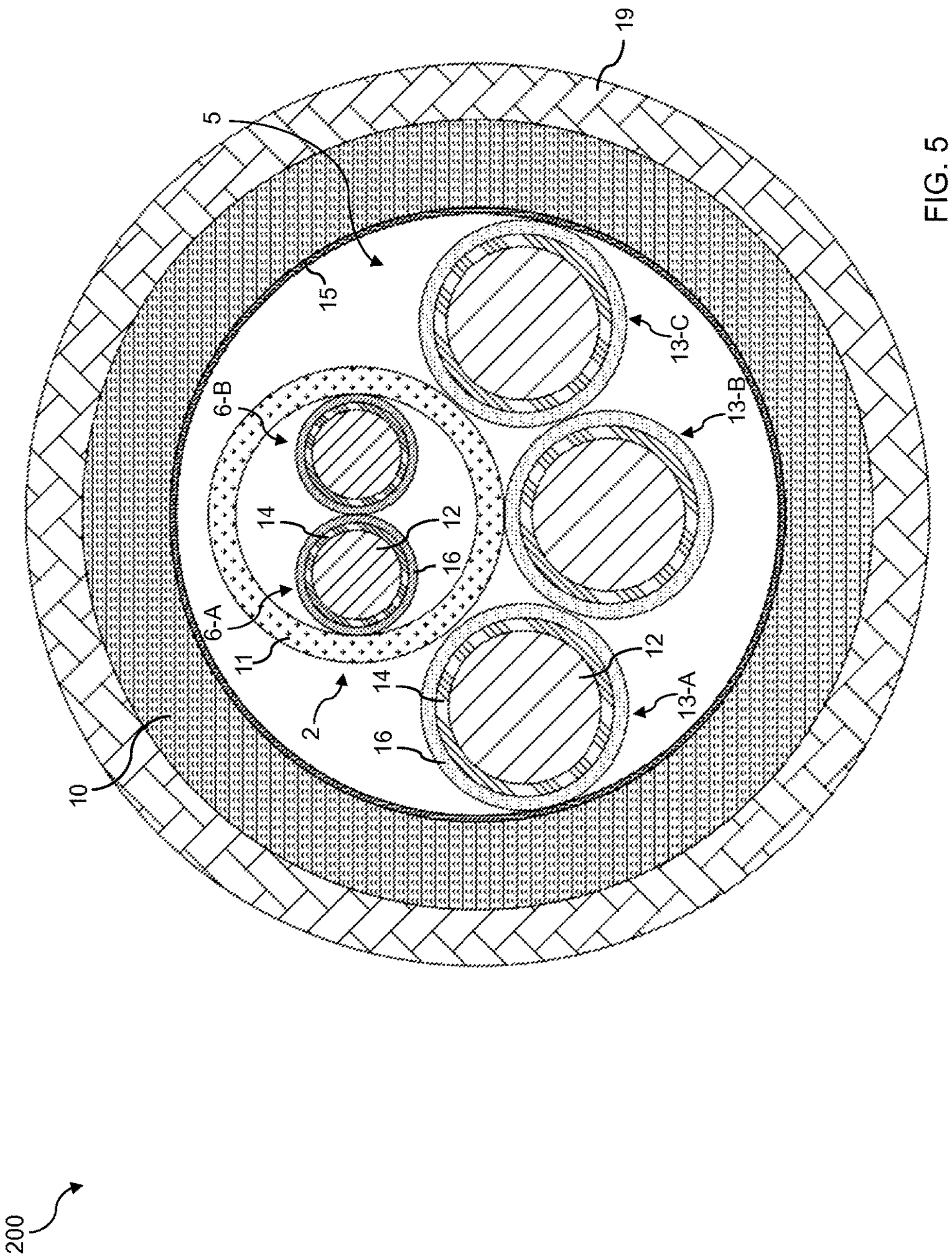
FIG. 5 is a cross-sectional view of another MC cable assembly according to an exemplary approach.

Referring now to FIG. 5, an embodiment of an MC cable 200 according to another approach will be described in greater detail. As shown, an outer jacket layer 19 may be disposed around an exterior surface of metal sheath 10. The outer jacket layer 19 provides a corrosion resistant barrier for cables that are rated for wet locations and/or for direct burial. In this embodiment, outer jacket layer 19 is PVC may be a thermoplastic or a thermoset polymeric material, and has a thickness in the range of 30-85 mils.

Similar to above, conductors 6A-B and 13A-C shown in FIG. 5 may each include a stranded or solid electrical conductor 12 having a concentric insulation layer(s) 14 and a jacket layer 16 disposed on the insulation layer 14. Subassembly 2 may be disposed within assembly jacket layer 11, which extends along the length of the subassembly 2. The subassembly 2 and power conductors 13A-C may be surrounded by an assembly tape 15 and disposed within the metal sheath 10. The features of these individual elements may be the same as previously described in relation to the embodiment of FIG. 2.

Figure 6:
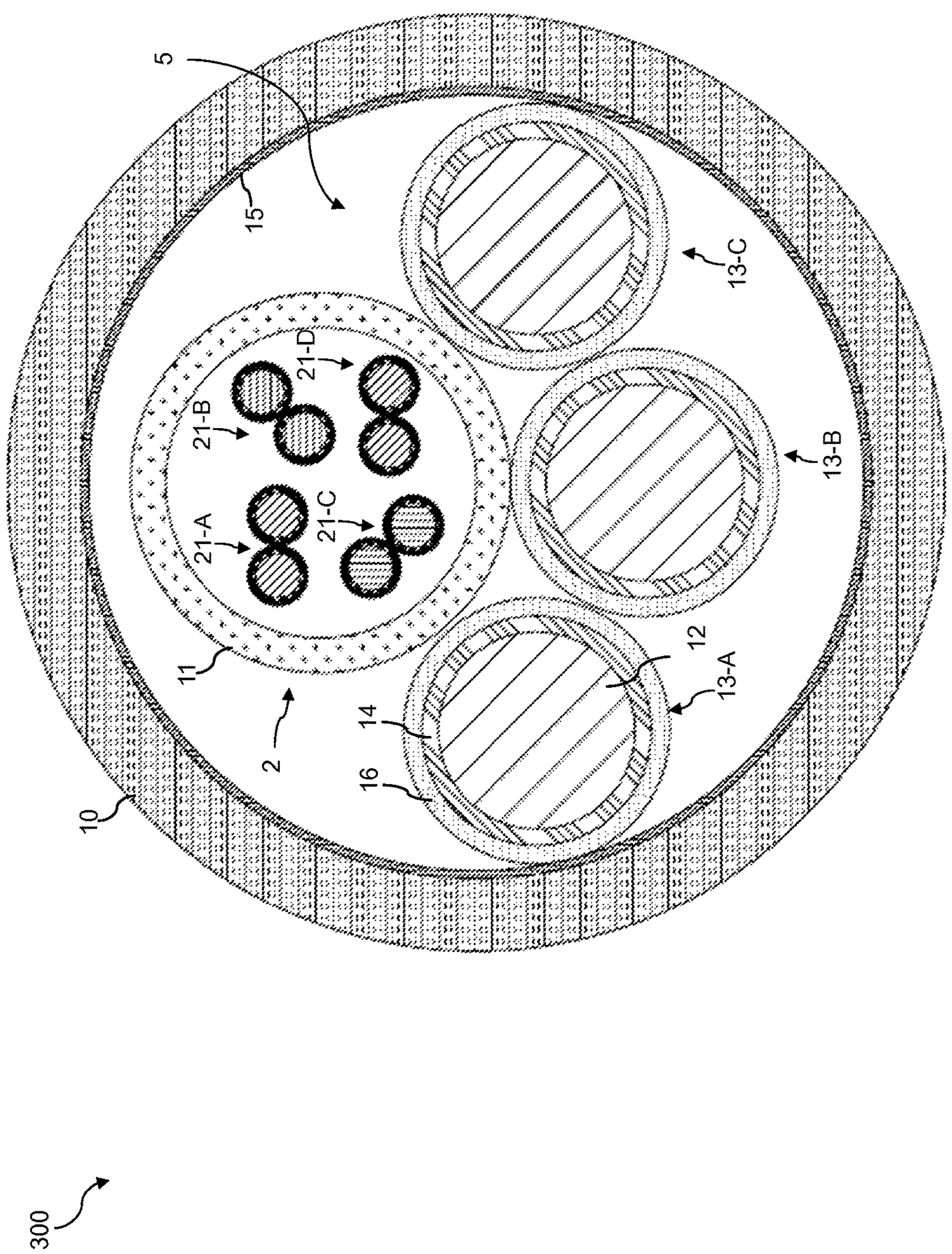
FIG. 6 is a cross-sectional view of another MC cable assembly according to an exemplary approach.

Referring now to the cross-sectional view of FIG. 6, an MC cable assembly 300 according to another approach will be described in greater detail. This embodiment can include a plurality of power conductors 13A-C, an assembly tape 15 and a metal sheath 10 having the same features as previously described in relation to FIG. 2. As shown, the MC cable assembly 300 may include a subassembly 2 having a plurality of communication/data cables, for example, NEC types CM (communications), CL (remote-control, signaling, and power-limited cables), and FPL (power-limited fire protective signaling cables). Communication/data cables 21A-D of subassembly 2 may be disposed within assembly jacket layer 11, which extends along the length of the subassembly 2. The assembly jacket layer 11 may have any or all of the features previously described in relation to FIG. 2.

The communication/data cables 21A-D may be cabled within assembly jacket 11, in a right or left hand lay, and the subassembly 2 may then be cabled (again, with a right or left hand lay) with the plurality of power conductors 13A-C to form core 5. Alternatively, communication/data cables 21A-D may extend longitudinally along the metal sheath 10 such that the longitudinal axis of each communication/data cable runs parallel to a longitudinal axis of metal sheath 10. Although the illustrated embodiment shows four individual communication/data cables 21A-D, it will be appreciated that any number of communication/data cables can be provided to form subassembly 2.

Referring now to the cross-sectional views of FIGS. 7-8, an MC cable assembly 400 according to another approach will be described in greater detail. As shown, conductors 6A-B and 13A-C can each include a stranded or solid electrical conductor 12 having a concentric insulation layer(s) 14, a jacket layer 16 disposed on the insulation layer 14, and a polymeric protective layer 18 disposed on the jacket layer 16. In one exemplary approach, the insulation layer 14 is a PVC material, the jacket layer 16 is a nylon material, and the polymeric protective layer 18 is a polypropylene material. In some approaches, each of the conductors 6A-B can have a size between 24 AWG and 6 AWG such that conductors 6A-B are configured to conduct a voltage between zero (0) and approximately 300 Volts. In some approaches, each of the plurality of power conductors 13A-C can have a size between 18 AWG and 6 AWG.

Figure 2:
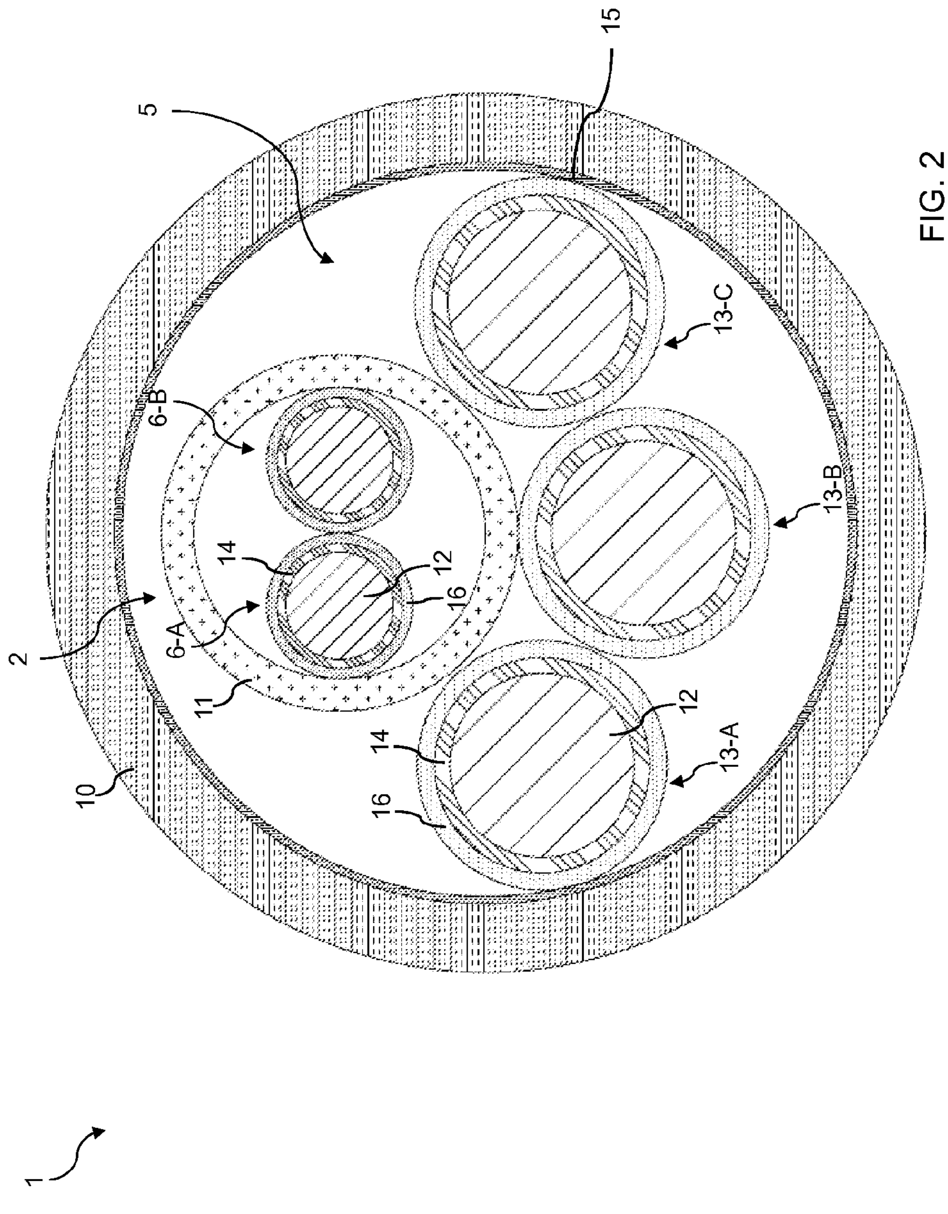
FIG. 2 is a cross-sectional view of the MC cable assembly of FIG. 1 taken along line A-A in FIG. 1.
Figure 3:
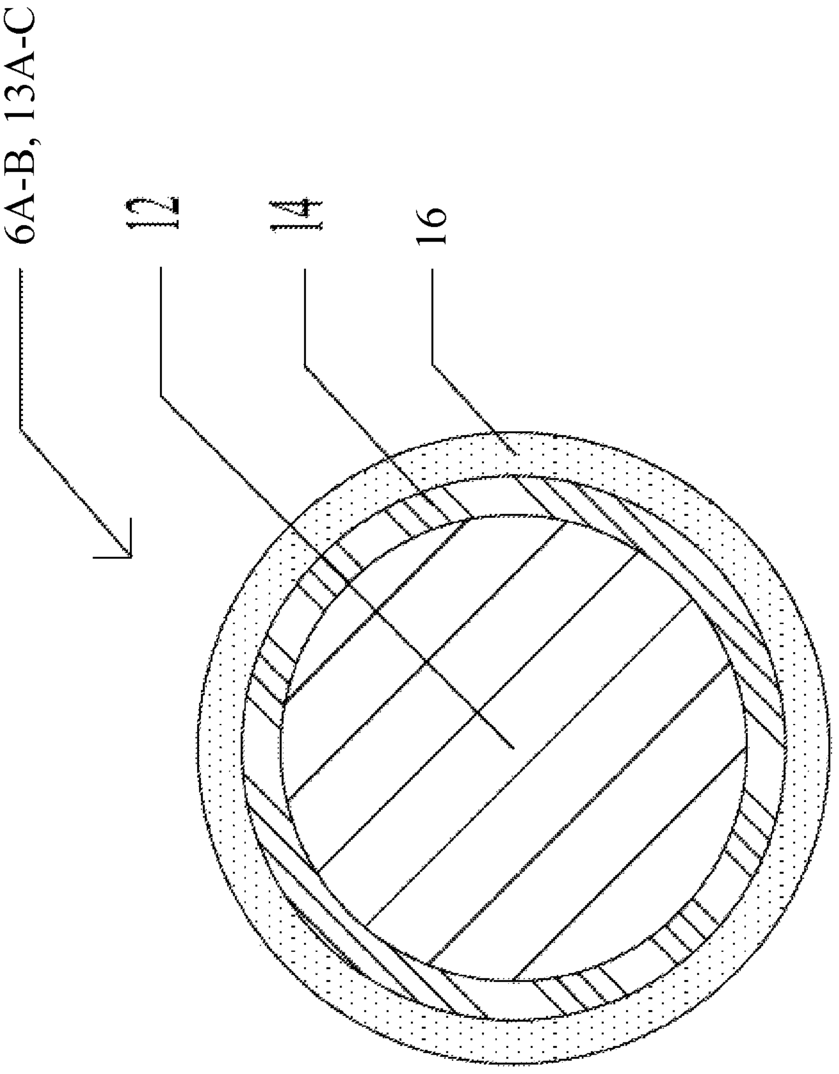
FIG. 3 is a detail cross-sectional view of an exemplary conductor of the MC cable assembly of FIG. 2 according to an exemplary approach.

The conductors 6A-B can be cabled together and enclosed in an assembly jacket layer 11 to form a subassembly 2 as previously described in relation to FIG. 2. The subassembly may be cabled together with the plurality of power conductors 13A-C, also in the manner described in relation to FIG. 2.

Figure 7:
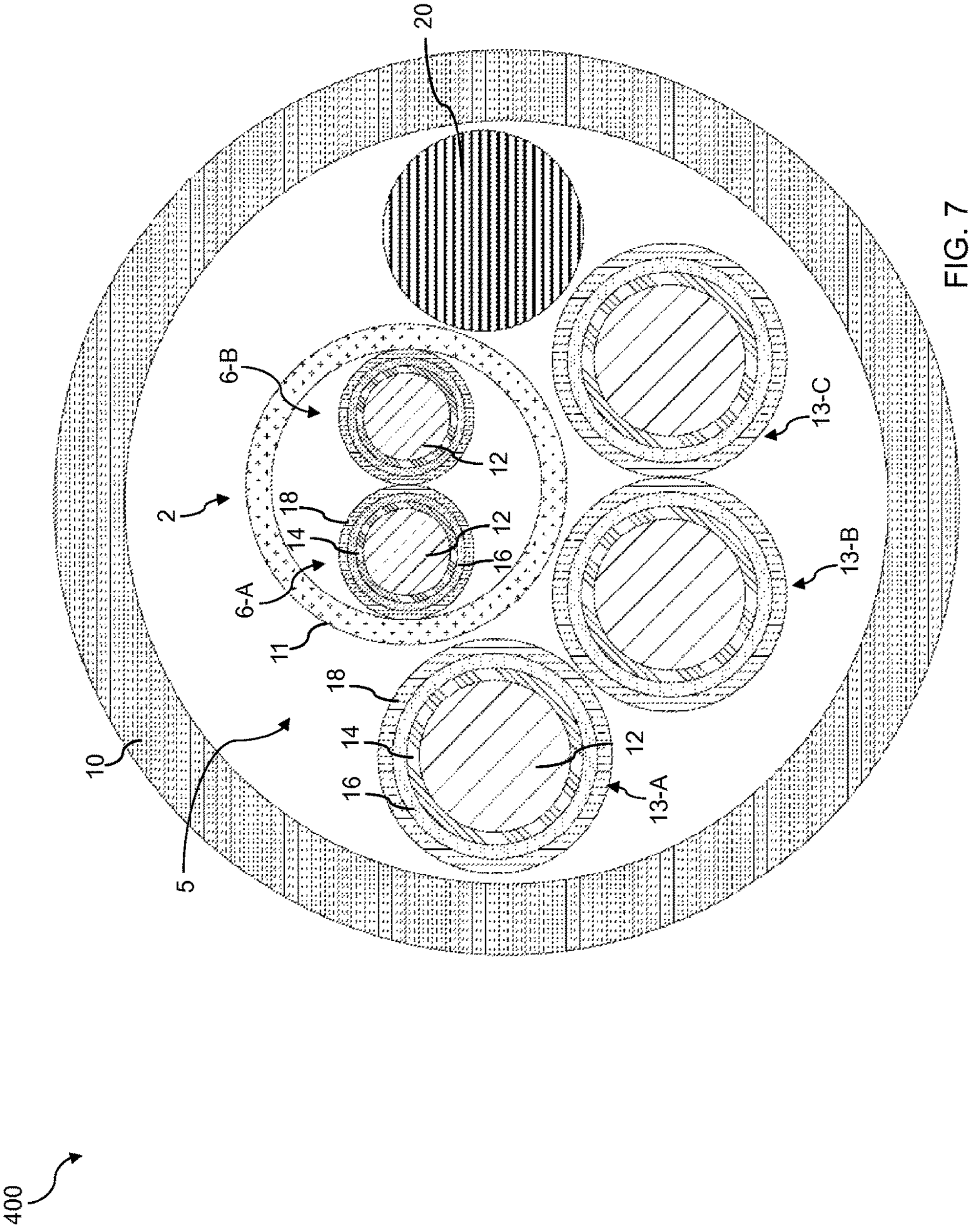
FIG. 7 is a cross-sectional view of another MC cable assembly according to an exemplary approach.
Figure 8:
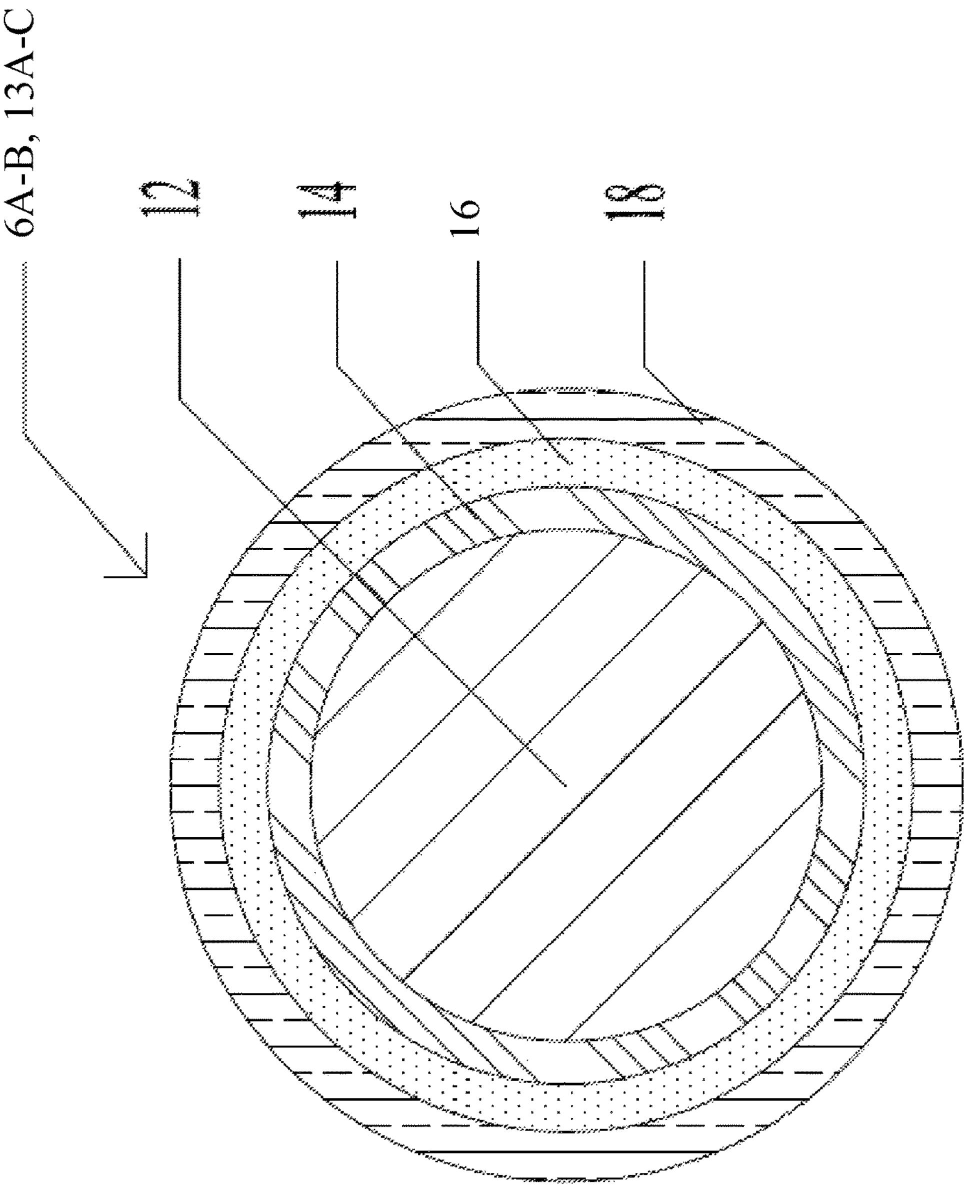
FIG. 8 is a detail cross-sectional view of an exemplary conductor of the MC cable assembly of FIG. 7 according to an exemplary approach.

The MC cable assembly 400 of FIGS. 7-8 can further include a bonding/grounding conductor 20 disposed within metal sheath 10. In an exemplary approach, bonding/grounding conductor 20 is a 10 AWG bare aluminum bonding/grounding conductor. Subassembly 2 and power conductors 13A-C of the core 5 may be cabled with the bonding/grounding conductor 20, for example, in either a right hand lay or a left hand lay. Alternatively, bonding/grounding conductor 20 may be disposed adjacent the core 5 along the metal sheath 10 such that the longitudinal axis of bonding/grounding conductor 20 runs parallel to a longitudinal axis of the core 5 and the metal sheath 10.

In some approaches, the polymeric protective layer 18 has a thickness between 2-15 mils and may be disposed over the jacket layer 16 and more particularly, may be extruded over the jacket layer. Although the polymeric protective layer 18 has been disclosed as being polypropylene, in some approaches it can be made from other materials such as, but not limited to, polyethylene, polyester, etc. The polymeric protective layer 18 can provide mechanical strength to resist buckling, crushing and scuffing of the core 5.

In some approaches, the polymeric protective layer 18 may be a foamed polymeric material that includes air pockets filled with gases, some or all of which may be inert. The polymeric protective layer 18 may provide proper positioning and tensioning of the bonding/grounding conductor 20. It may also be pliable to provide a conforming surface to that of the inside of the metal sheath or the adjacently positioned conductor assemblies.

Metal sheath 10 may be formed as a seamless or welded continuous sheath, and has a generally circular cross section with a thickness of about 0.005 to about 0.060 inches. The sheath 10 may also be formed into shapes other than generally circular such as, for example, rectangles, polygons, ovals and the like. Metal sheath 10 provides a protective metal covering around core 5 and the bonding/grounding conductor 20.

Although not shown, it will be appreciated that MC cable assembly 400 may include one or more filler members (not shown) within metal sheath 10. In one approach, a longitudinally oriented filler member is disposed within metal sheath 10 adjacent to subassembly 2 and/or one or more of the plurality of power conductors 13A-C to press subassembly 2, power conductors 13A-C and/or bonding/grounding conductor 20 radially outward into contact with the inside surface of metal sheath 10. The filler member can be made from any of a variety of fiber or polymer materials. Furthermore, the filler member can be used with MC Cable assemblies having any number of insulated conductor assemblies.

Figure 9:
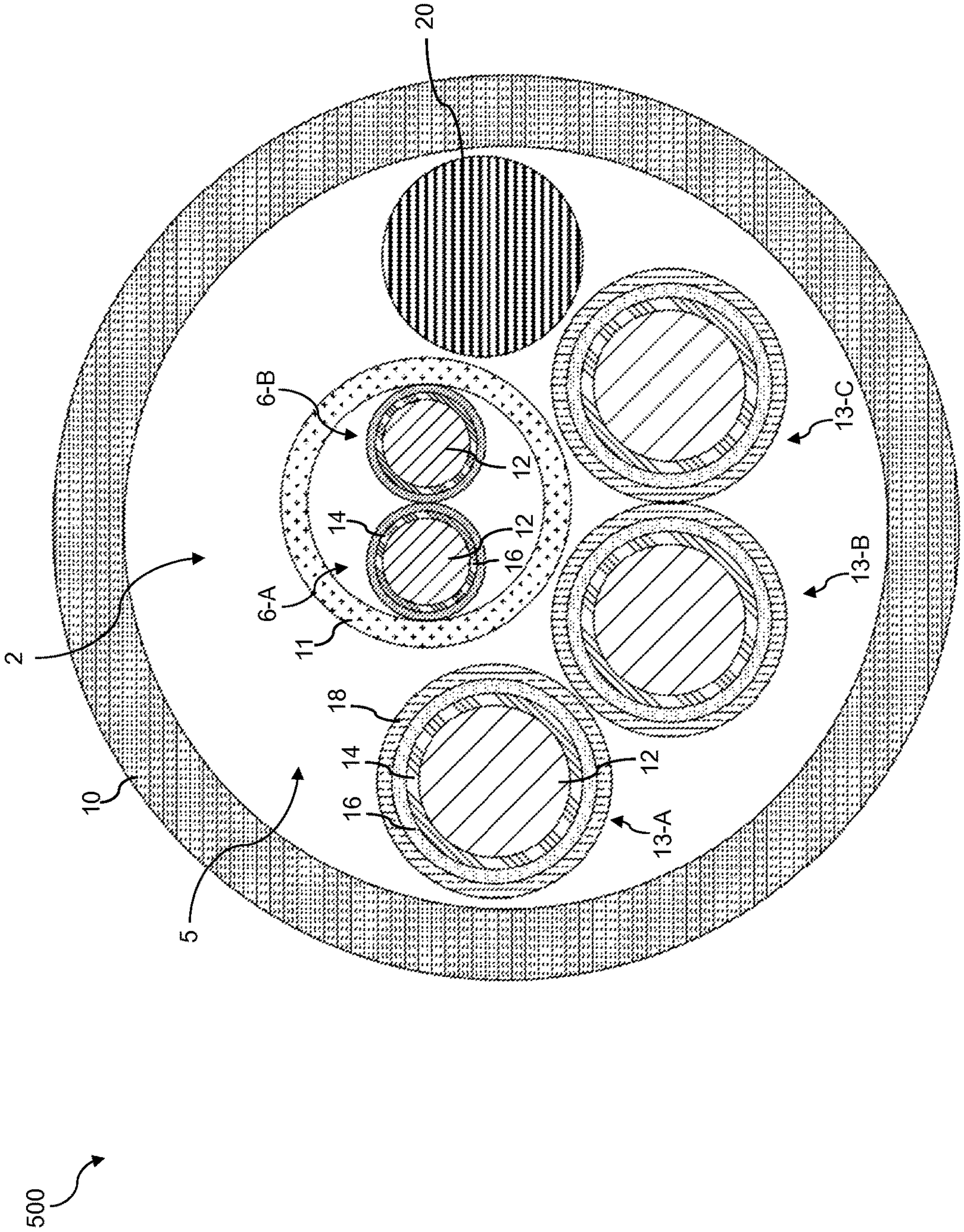
FIG. 9 is a cross-sectional view of another MC cable assembly according to an exemplary approach.

Referring now to the cross-sectional view of FIG. 9, an MC cable 500 according to another approach will be described in greater detail. This embodiment can include a plurality of power conductors 13A-C, a bonding/grounding conductor 20 and a metal sheath 10 having the same features as previously described in relation to FIGS. 7 and 8. In the illustrated embodiment, conductors 6A-B of MC cable 500 may each include only electrical conductor 12, insulation layer(s) 14, and jacket layer 16. No polymeric protective layer is present over jacket layer 16 along any of conductors 6A-B. In this approach, the assembly jacket layer 11 functions in place of the protective polypropylene layer. The conductors 6A-B may be cabled together in a right or left hand lay, and enclosed in an assembly jacket layer 11 having the same features described in relation to previous embodiments.

Figure 10:
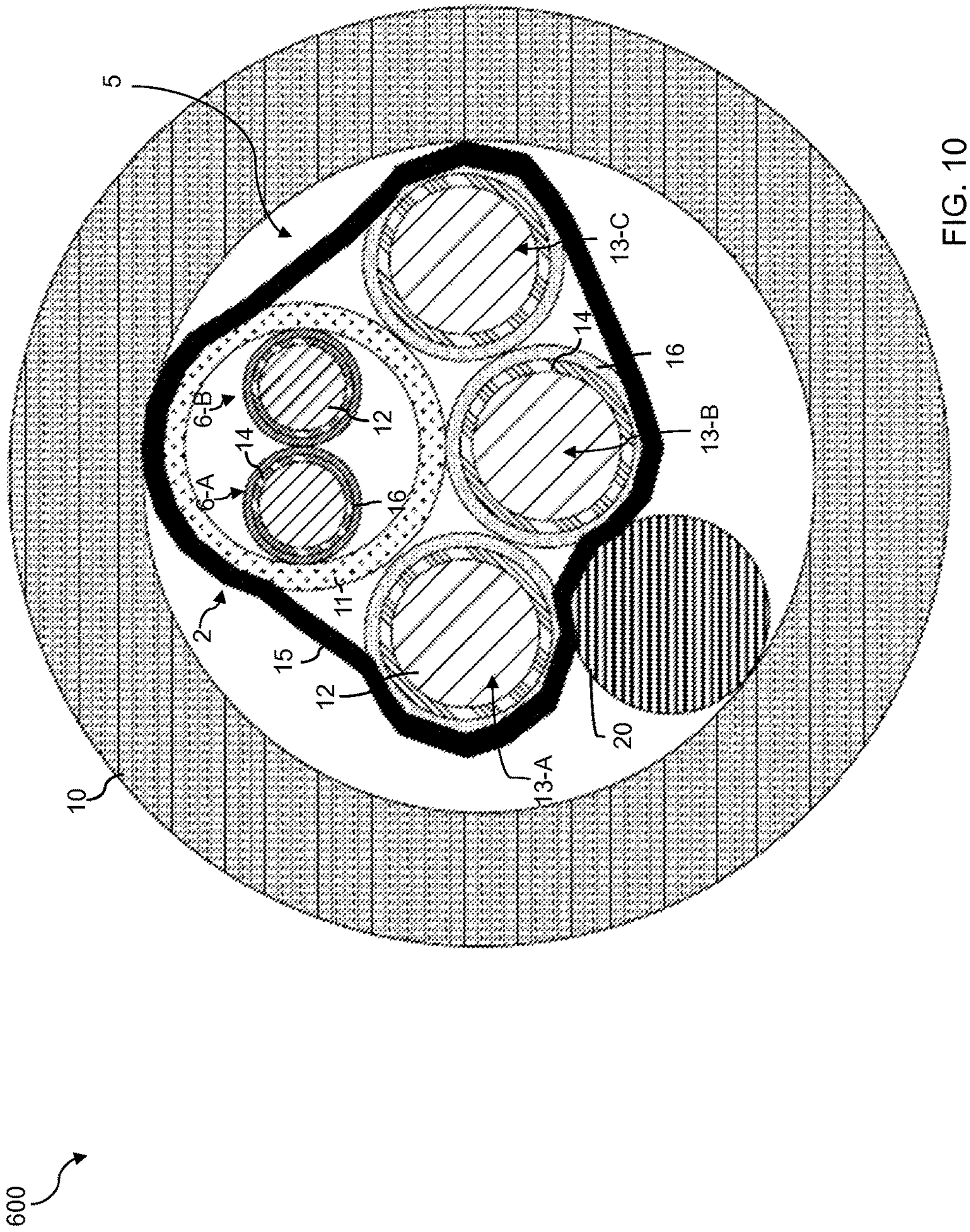
FIG. 10 is a cross-sectional view of another MC cable assembly according to an exemplary approach.

Referring now to FIG. 10, an MC cable assembly 600 according to another approach will be described in greater detail. In this embodiment, assembly tape 15 is disposed around subassembly 2 and conductors 13A-C such that bonding/grounding conductor 20 is disposed between assembly tape 15 and metal sheath 10. This allows subassembly 2 to be used across multiple MC cable constructions.

In this embodiment, conductors 6A-B and 13A-C can each include a stranded or solid electrical conductor 12 having a concentric insulation layer(s) 14, and a jacket layer 16 disposed on the insulation layer 14. In this approach, no polymeric protective layer is present over jacket layer 16 along any of conductors 6A-B and 13A-C, as the assembly tape 15 functions in place of the protective polypropylene layer.

In this embodiment, the conductors 6A-B of MC cable assembly 500 may be cabled together and covered with assembly jacket layer 11 to form subassembly 2. Subassembly 2 may be cabled together, in a right or left hand lay, with the plurality of power conductors 13A-C, and the resulting core 5 may be covered by the assembly tape 15. The bonding/grounding conductor 20 may be cabled with the core 5, or it may be laid parallel to the core 5 within the metal sheath 10.

Figure 11:
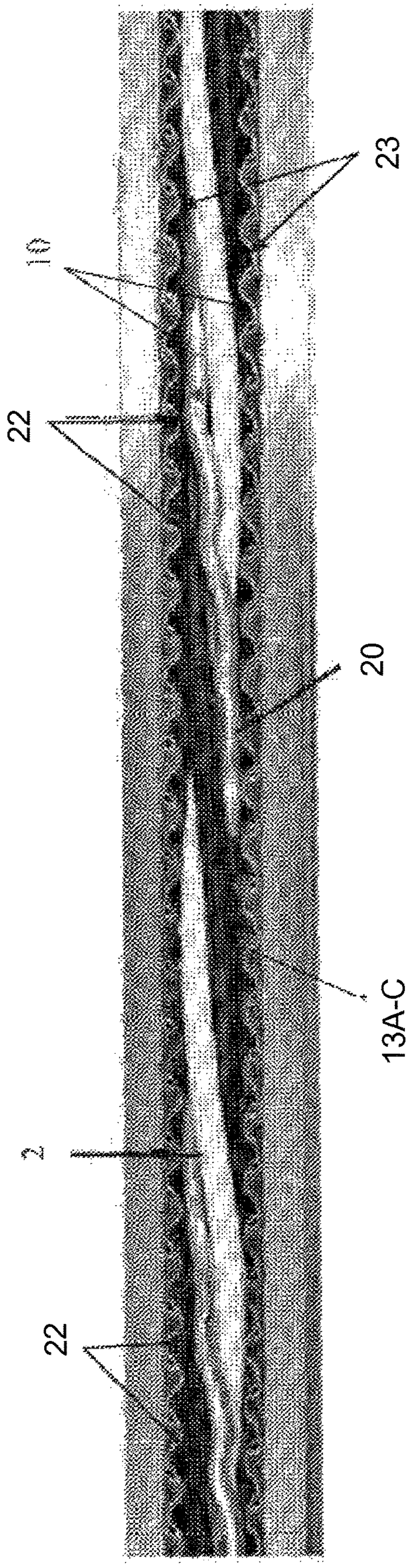
FIG. 11 is a side cutaway view of another MC cable assembly according to an exemplary approach.

FIG. 11 is a length-wise cross-sectional view of the MC cable assembly of FIG. 7, showing the cabled relationship between the subassembly 2, plurality of power conductors 13A-C, and the bonding/grounding conductor 20. Also visible in this view is the optional non-linear nature of the bonding/grounding conductor 20. As can be seen, this non-linearity in the bonding/grounding conductor 20 may manifest in a plurality of undulations 22 disposed along the length of the conductor. As will be described in greater detail later, these undulations 22 serve to provide a robust connection between the bonding/grounding conductor 20 and the metal sheath 10, while also introducing a degree of resiliency or "spring" into the connection. As will be appreciated, this resiliency can make it easier to remove the metal sheath 10 from the subassembly 2, plurality of power conductors 13A-C, and bonding/grounding conductor 20, for example, when making terminal connections in the field.

Figure 12:
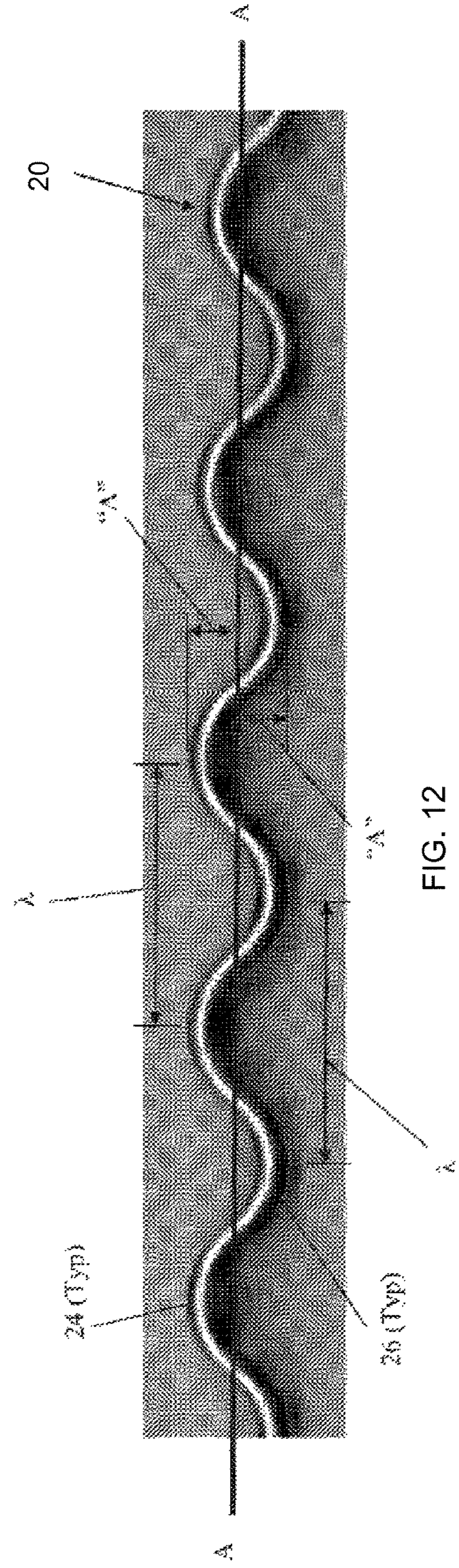
FIG. 12 is a side view of a non-linear bonding/grounding conductor according to an exemplary approach.
Figure 13:
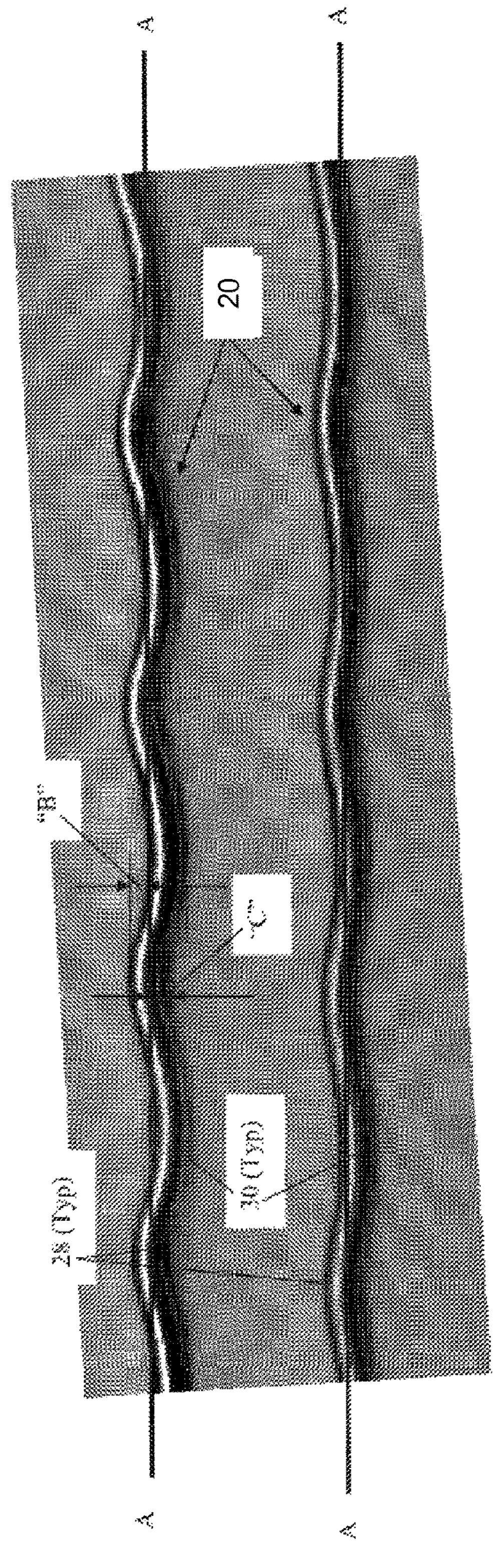
FIG. 13 is a side view of another non-linear bonding/grounding conductor according to an exemplary approach.

As shown in the approaches of FIGS. 11-13, bonding/grounding conductor 20 is disposed within the metal sheath 10 and is cabled with subassembly 2 and plurality of power conductors 13A-C. Alternatively, bonding/grounding conductor 20 may not be cabled with the conductor assemblies, but rather may extend longitudinally along the inside surface of the metal sheath 10 such that a longitudinal axis of the bonding/grounding conductor 20 runs substantially parallel to a longitudinal axis of metal sheath 10.

As shown in FIG. 11, the bonding/grounding conductor 20 may be in direct contact with an inner surface 23 of the metal sheath 10 and may act in combination with the sheath 10 to define a metal sheath assembly having an ohmic resistance value about equal to or lower than the ohmic resistance requirements necessary to qualify as an equipment grounding conductor. Alternatively, the bonding/grounding conductor 20 may itself have sufficient ohmic resistance to qualify as an equipment grounding conductor.

FIGS. 12 and 13 illustrate approaches of the non-linear bonding/grounding conductor 20 for use in the disclosed MC cable assemblies. As can be seen in FIG. 12, one exemplary approach of the bonding/grounding conductor 20 has a sinusoidal shape including a plurality of alternating crests 24 and troughs 26 repeat along the longitudinal axis "A-A" of the bonding/grounding conductor. The distance "λ" between adjacent crests 24 and between adjacent troughs 26 can be selected, along with a peak amplitude "A" of the crests 24 and troughs 26, to provide a desired resiliency of the bonding/grounding conductor 20.

In one non-limiting exemplary approach, about nineteen (19) crests and troughs may be provided per linear foot of bonding/grounding conductor 20. This number is, of course, not limiting and is provided merely for purposes of example. In addition, the peak amplitude "A" may be selected so that when the cable is fully assembled, the bonding/grounding conductor 20 has an outer dimension (i.e., two times the peak amplitude "A") that is about equal to or slightly larger (e.g., 0.005 inches) than the outer diameter of the insulated conductors. In other approaches, the peak amplitude "A" may be selected so that when the cable is fully assembled, the bonding/grounding conductor 20 has an outer dimension (i.e., two times the peak amplitude "A") that is slightly smaller than the outer diameter of subassembly 2 and plurality of power conductors 13A-C.

It will be appreciated that the bonding/grounding conductor 20 can be subject to tension forces during the cabling process, and thus the number of crests and troughs per foot may decrease as the bonding/grounding conductor stretches under such tension. The bonding/grounding conductor 20 may, therefore, be manufactured so that the peak amplitude "A" of the crests 24 and troughs 26 in the non-tensioned state is slightly greater than the peak amplitude "A" of the crests 24 and troughs 26 in the tensioned state (i.e., the cabled state).

FIG. 13 shows an approach of the bonding/grounding conductor 20 in which a "wave" pattern is provided. As can be seen, the bonding/grounding conductor 20 can include asymmetrical crests 28 and troughs 30 such that the crests have a shape that is different from the immediately adjacent troughs. In this approach, the crests 28 may have a peak amplitude "B" that is different in magnitude as compared to the peak amplitude "C" of the troughs 30.

It will be appreciated that although sinusoidal and wave geometries have been illustrated, the bonding/grounding conductor 20 can be provided in any of a variety of other geometries to provide the desired undulating arrangement. Examples of such alternative geometries include saw-tooth wave patterns, square wave patterns, spike wave patterns, and the like.

It will be appreciated that the bonding/grounding conductor 20 may have the disclosed undulations (alternating crests and troughs) applied as part of an in-line process of forming an MC cable. Alternatively, the undulations can be imparted to the bonding/grounding conductor 20 in a separate off-line process and then brought "pre-formed" to the cabling/twisting process used to form the MC cable.

The bonding/grounding conductor 20 may be made from any of a variety of materials, including aluminum, copper, copper clad aluminum, tinned copper and the like. In one non-limiting exemplary approach, the bonding/grounding conductor 20 is aluminum.

Figure 14:
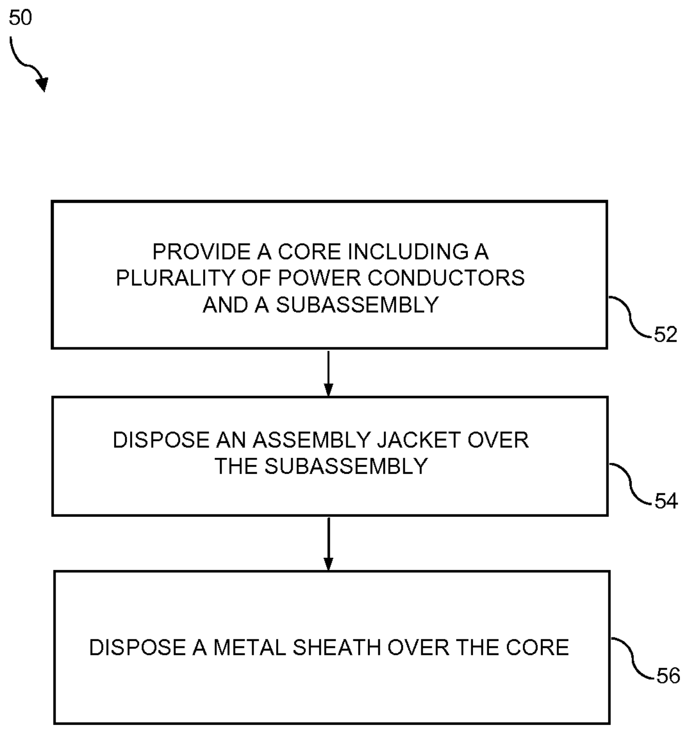
FIG. 14 is a flow chart illustrating an exemplary method of making an MC cable assembly.

Referring now to FIG. 14, a method 50 of making an MC cable assembly will be described in greater detail. Method 50 includes providing a core including a plurality of power conductors cabled with a subassembly, each of the plurality of power conductors and the subassembly including an electrical conductor, a layer of insulation, and a jacket layer, as shown in block 52. In some approaches, a protective layer is formed (e.g., extruded) over the jacket layer of one or more of the plurality of power conductors and the subassembly. In some approaches, the subassembly comprises a cabled set of conductors operating as class 2 or class 3 circuit conductors that are cabled together in a right or left hand lay. In some approaches the plurality of power conductors includes first, second and third power conductors (e.g., 120V or 277V). In some approaches, the layer of insulation and the jacket layer are extruded over each of the individual electrical conductors of the plurality of power conductors and the subassembly. Method 50 can further include disposing an assembly jacket layer over the subassembly, as shown in block 54. In some approaches, the plurality of power conductors and the subassembly are then cabled together in a right or left hand lay. Method 50 further includes disposing a metal sheath over the core, as shown in block 56.

Figure 15:
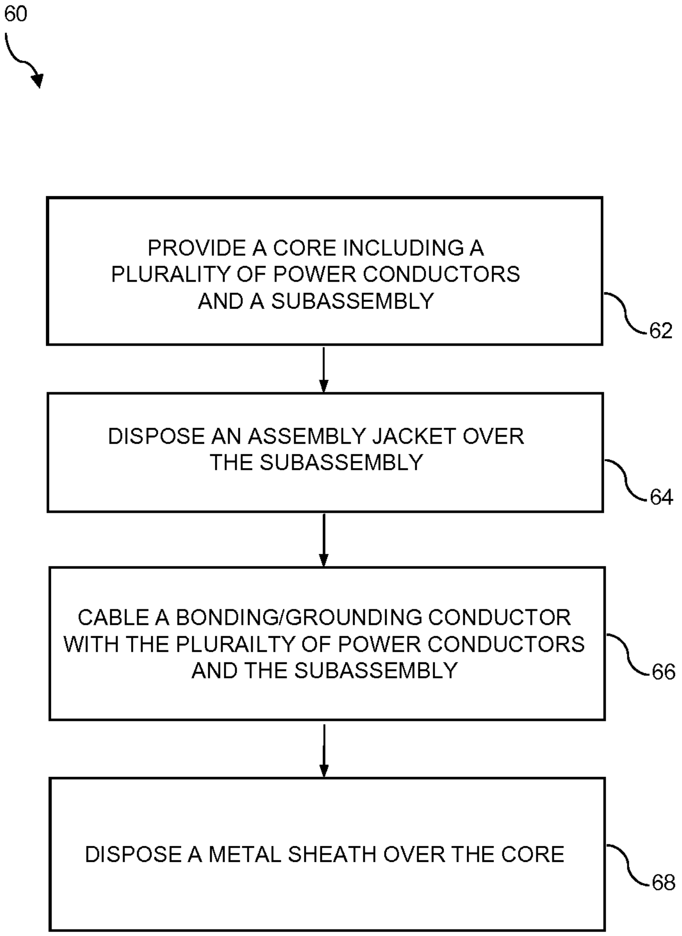
FIG. 15 is a flow chart illustrating another exemplary method of making an MC cable assembly.

Referring now to FIG. 15, a method 60 of making an MC cable assembly will be described in greater detail. Method 60 includes providing a core including a plurality of power conductors and a subassembly, each of the plurality of power conductors and the subassembly including an electrical conductor, a layer of insulation, and a jacket layer, as shown in block 62. In some approaches, a protective layer is formed (e.g., extruded) over the jacket layer of one or more of the plurality of power conductors and the subassembly. In some approaches, the subassembly comprises a cabled set of conductors operating as class 2 or class 3 circuit conductors that are cabled together in a right or left hand lay. In some approaches the plurality of power conductors includes first, second and third power conductors (e.g., 120V or 277V). In some approaches, the layer of insulation and the jacket layer are extruded over each of the individual electrical conductors of the plurality of power conductors and the subassembly. Method 60 can further include disposing an assembly jacket layer over the subassembly, as shown in block 64. In some approaches, the plurality of power conductors and the subassembly are then cabled together in a right or left hand lay. Method 60 can further include cabling a bonding/grounding conductor together with the plurality of power conductors and the subassembly in a right or left hand lay, as shown in block 66. Method 60 can further include disposing a metal sheath over the plurality of power conductors and the subassembly, as shown in block 68.

As will be appreciated, the various approaches described herein for using the cabled subassembly as class 2 or 3 circuit conductors that are covered by a PVC jacket within a metal clad cable containing power conductors provide a variety of advantages/improvements including, but not limited to, reducing cable installation time and cost, reducing materials (e.g., additional fittings for class 2 or 3 cables), and providing mechanical protection for all conductors within the cable.

While the present disclosure has been described with reference to certain approaches, numerous modifications, alterations and changes to the described approaches are possible without departing from the sphere and scope of the present disclosure, as defined in the appended claims. Accordingly, it is intended that the present disclosure not be limited to the described approaches, but that it has the full scope defined by the language of the following claims, and equivalents thereof. While the disclosure has been described with reference to certain approaches, numerous modifications, alterations and changes to the described approaches are possible without departing from the spirit and scope of the disclosure, as defined in the appended claims. Accordingly, it is intended that the present disclosure not be limited to the described approaches, but that it has the full scope defined by the language of the following claims, and equivalents thereof.

What is claimed is:

1. A metal clad cable assembly, comprising:

a core comprising a plurality of power conductors and a subassembly, each of the plurality of power conductors and the subassembly including an electrical conductor, a layer of insulation, and a jacket layer;

an assembly jacket layer disposed only over the subassembly, wherein the jacket layer of each of the plurality of power conductors is provided directly adjacent the assembly jacket layer, and wherein the assembly jacket layer is an extruded assembly jacket layer;

an assembly tape disposed around the core;

a metal sheath disposed around the assembly tape; and a bonding/grounding conductor disposed between the assembly tape and the metal sheath.

2. The metal clad cable assembly of claim 1, wherein the subassembly comprises a cabled set of conductors.

3. The metal clad cable assembly of claim 2, wherein each of the cabled set of conductors is configured to conduct a voltage between zero (0) and approximately 300 Volts.

4. The metal clad cable assembly of claim 2, wherein each of the cabled set of conductors has a size between 24 American Wire Gauge (AWG) and 6 AWG, and wherein each of the plurality of power conductors has a size between 18 AWG and 2000 KCM.

5. The metal clad cable assembly of claim 1, wherein the bonding/grounding conductor is cabled with the plurality of power conductors and the subassembly.

6. The metal clad cable of claim 1, further comprising a core jacket layer disposed around the core.

7. The metal clad cable assembly of claim 1, wherein the plurality of power conductors and the subassembly are cabled together.

8. The metal clad cable assembly of claim 1, further comprising a protective layer disposed over the jacket layer of one or more of the plurality of power conductors and the subassembly.

9. A metal clad cable assembly, comprising:

a core including a plurality of power conductors cabled with a subassembly, each of the plurality of power conductors and the subassembly including an electrical conductor, a layer of insulation, and a jacket layer;

an assembly jacket layer disposed only over the subassembly, wherein the jacket layer of each of the plurality of power conductors is provided directly adjacent the assembly jacket layer, and wherein the assembly jacket layer is an extruded assembly jacket layer;

an assembly tape disposed around the core;

a metal sheath disposed around the assembly tape; and a bonding/grounding conductor disposed between the assembly tape and the metal sheath.

10. The metal clad cable assembly of claim 9, where the subassembly comprises a cabled set of conductors.

11. The metal clad cable assembly of claim 10, wherein each of the cabled set of conductors has a size between 24 American Wire Gauge (AWG) and 6 AWG, and wherein each of the plurality of power conductors has a size between 18 AWG and 2000 KCM.

12. The metal clad cable assembly of claim 9, further comprising a protective layer disposed over one or more of the plurality of power conductors and the subassembly.

13. A method of making a metal clad cable assembly, comprising:

providing a core including a plurality of power conductors cabled with a subassembly, each of the plurality of power conductors and the subassembly including an electrical conductor, a layer of insulation, and a jacket layer;

disposing an assembly jacket layer only over the subassembly, wherein the jacket layer of each of the plurality of power conductors is provided directly adjacent the assembly jacket layer, and wherein the assembly jacket layer is an extruded assembly jacket layer;

disposing an assembly tape around the core; and disposing a metal sheath over the core, wherein a bonding/grounding conductor is provided between the assembly tape and the metal sheath.

14. The method of claim 13, wherein providing the core comprises cabling together a set of conductors of the subassembly.

15. The method of claim 13, further comprising disposing a protective layer over the jacket layer of one or more of the plurality of power conductors and the subassembly.

16. The method of claim 13, further comprising cabling a bonding/grounding conductor with the plurality of power conductors and the subassembly.

17. A metal clad cable assembly, comprising:

a core comprising a plurality of power conductors and a subassembly of conductors, each of the plurality of power conductors and the subassembly including an electrical conductor, a layer of insulation surrounding the electrical conductor, and a jacket layer surrounding the layer of insulation;

an assembly jacket layer disposed between the subassembly and one or more of the plurality of power conductors, wherein the jacket layer of at least one conductor of the subassembly is provided directly adjacent the assembly jacket layer, wherein the jacket layer of each of the plurality of power conductors is provided directly adjacent the assembly jacket layer, and wherein the assembly jacket layer is an extruded assembly jacket layer;

an assembly tape disposed around the core;

a metal sheath disposed around the assembly tape; and a bonding/grounding conductor disposed between the assembly tape and the metal sheath.

* * * * *